United States Patent [19]

Fong

[11] Patent Number: 4,786,561
[45] Date of Patent: Nov. 22, 1988

[54] HEAT-SHRINKABLE POLYMERIC BARRIER FILM

[75] Inventor: Dan S. C. Fong, Wilmington, Del.

[73] Assignee: E. I. Du Pont de Nemours and Company, Wilmington, Del.

[21] Appl. No.: 39,318

[22] Filed: Apr. 15, 1987

Related U.S. Application Data

[60] Division of Ser. No. 859,204, Apr. 28, 1986, Pat. No. 4,690,865, which is a continuation-in-part of Ser. No. 839,921, Mar. 17, 1986, abandoned.

[51] Int. Cl.$^4$ .................... B32B 27/08; B05D 3/02
[52] U.S. Cl. .................... 428/502; 427/171; 427/393.5
[58] Field of Search .................... 427/171, 393.5; 428/502, 505, 523

[56] References Cited

U.S. PATENT DOCUMENTS

| | | | |
|---|---|---|---|
| 3,262,808 | 7/1966 | Crooks et al. | 427/171 X |
| 4,421,780 | 12/1983 | Buzio et al. | 427/40 |
| 4,423,089 | 12/1983 | Sekiya et al. | 427/171 |

Primary Examiner—Thurman K. Page

[57] ABSTRACT

A heat-shrinkable barrier film comprised of an oriented polyolefin film coated on one side with a vinylidene chloride copolymer are disclosed. The films have excellent gas and vapor barrier properties, can surprisingly be made using conventional dispersion coating techniques, and retain acceptable optical properties even on shrinking up to as high as 35% in either transverse or machine directions or both.

11 Claims, 2 Drawing Sheets

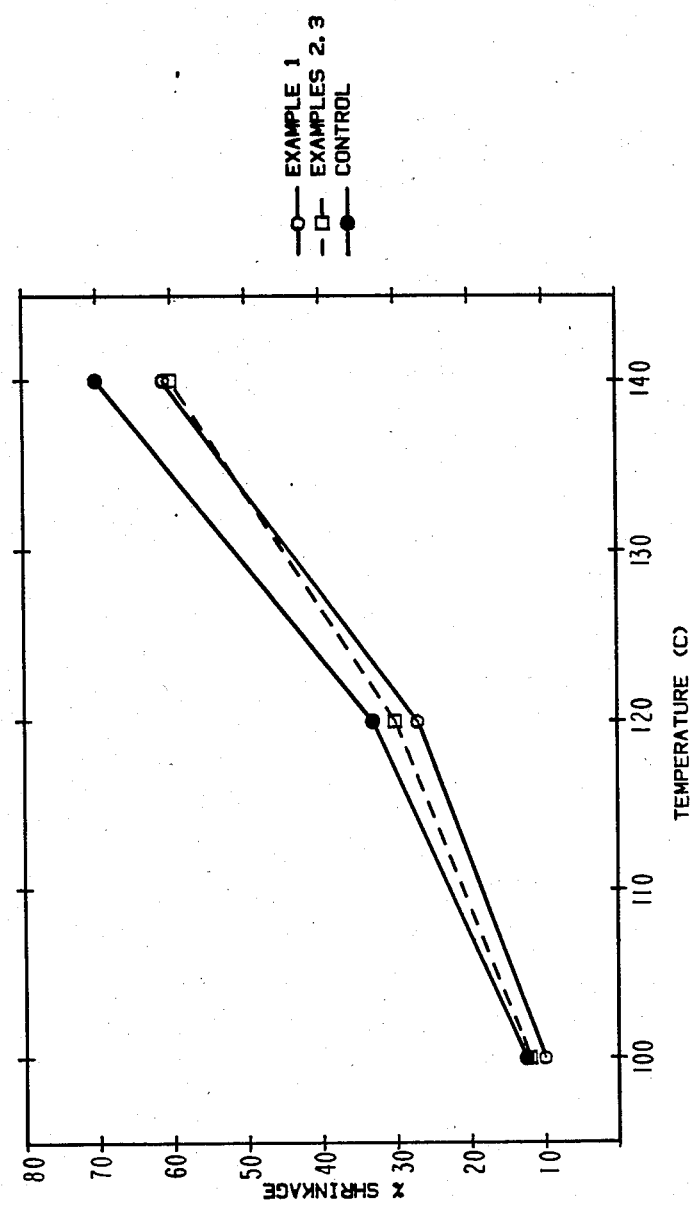

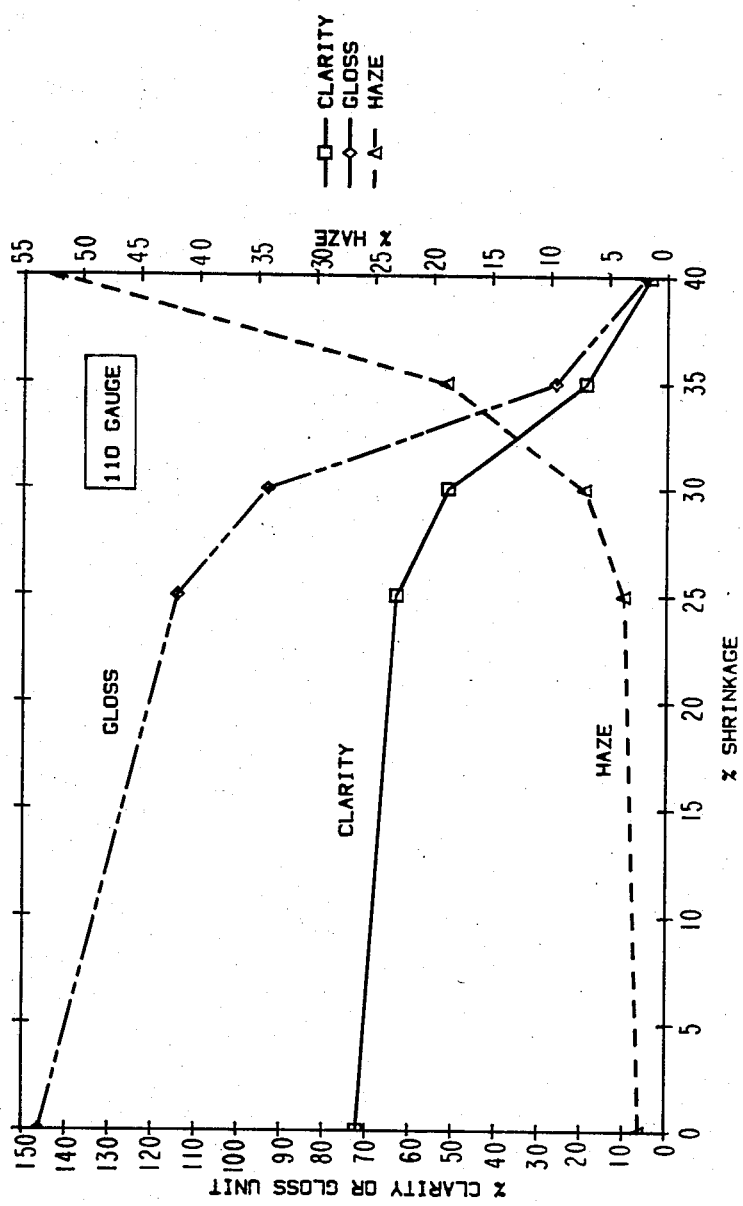

HEAT-SHRINKABLE POLYMERIC BARRIER FILM

This is a division of application Ser. No. 859,204, filed Apr. 28, 1986 now U.S. Pat. No. 4,690,865, which is in turn a continuation-in-part of application Ser. No. 839,921, filed Mar. 17, 1986 now abandoned.

BACKGROUND OF THE INVENTION

This invention relates to a heat-shrinkable barrier film comprised of an oriented polyolefin shrink film coated on at least one side with a vinylidene chloride copolymer.

For many years the desirability of obtaining a heat-shrinkable film also possessing oxygen and moisture barrier properties has been known. Heat-shrinkable films are used in packaging applications where the film must fit snugly about a contained product, thereby presenting an attractive package appearance. Since many such packaging applications involve the packaging of perishable foods, it is clearly desirable that the packaging material also provide a barrier to protect the food from oxygen and moisture.

Films made of vinylidene chloride copolymers (VDC copolymer) are known to have low permeability to oxygen, carbon dioxide and moisture and are thus good barrier films. VDC copolymers are copolymers of 65 to 96% by weight of vinylidene chloride and 4 to 35% of one or more comonomers such as vinyl chloride, acrylonitrile, methyl methacrylate, or methyl acrylate, and are generally referred to as saran. The term VDC copolymer as used herein emcompasses terpolymers as well. The barrier properties of VDC copolymers tend to increase with increasing vinylidene chloride content in the copolymer. Thus, VDC copolymers having at least about 85% by weight, and preferably at least about 90% by weight, vinylidene chloride comonomer are especially desired for high barrier properties. Generally, however, as the vinylidene chloride content of the VDC copolymer increases, the degree of crystallinity of the VDC copolymer increases, leading to a more brittle film with corresponding low impact strength. For example, a vinylidene chloride acrylonitrile copolymer containing approximately 5% acrylonitrile will have an elongation-at-break of less than 15%, which would be characterized as brittle because it can stand no bending without breaking into fragments. The problems inherent in incorporating such a brittle, yet high barrier, film into a film that must be capable of shrinking from 15 to 40%, for example, are clear.

Because of their excellent barrier properties, many attempts have been made to incorporate VDC copolymers into heat-shrinkable films. By far the majority of these attempts have involved coextruded or laminated structures with a minimum of three layers. Examples can be found in the following patents: U.S. Pat. Nos. 4,542,075; 4,501,780; 4,456,646; 4,448,792; 4,436,778; 4,390,587; 4,207,363; 4,018,337. In each of the films disclosed in these patents, the VDC copolymer is contained in an interior layer of a three-or-more layered structure.

Only three patents are known which disclose heat-shrinkable barrier films incorporating VDC copolymers in which such copolymers are neither coextruded nor laminated in forming the structure. French Pat. No. 2,450,205 discloses a barrier bag with a structure comprising at least three layers, and, preferably, at least five layers with the use of adhesives. The base material is irradiated, oriented (heat-shrinkable) polyethylene. The barrier layer is VDC copolymer coated from an aqueous solution, with or without adhesive. A third layer of polyethylene is laminated onto the barrier layer to complete the packaging material. A very similar structure is disclosed in British Patent Specification No. 1,591,423 which provides for a laminate of a first layer of polyethylene having a layer of VDC copolymer coated thereon and a second layer of polyethylene adhered to the barrier layer. British Patent Specification No. 1,591,424 also discloses multi-layer structures, the preferred structure being a seven-ply structure plus adhesives. VDC copolymers are disclosed as possible barrier layers but are less preferred to blends of nylon-6 and hydrolyzed copolymer of ethylene and vinyl acetate. In these three patents, as with those listed previously, the VDC copolymer layer is always situated in the film structure between at least two other layers of polymer.

SUMMARY OF THE INVENTION

A new heat-shrinkable barrier film has now been found which consists essentially of an oriented, shrinkable polyolefin film coated on at least one side with a VDC copolymer. Tests indicate that the VDC copolymer coating serves to improve the oxygen and moisture barrier properties of the polyolefin film by as much as 300-fold and 2-fold, respectively. Surprisingly, the barrier film can be prepared in conventional dispersion coating towers in which film temperatures as great as 60° C. or even higher can be reached with negligible shrinkage of the film. The two layer film has no curl to one side or the other, and thus avoids a problem common to many two-layered films. Also, the optical and slip properties of these barrier films remain acceptable even when shrunk to levels as high as 35% in either the transverse or machine directions, or both. This is very surprising in view of the known brittleness of the VDC copolymers, especially the high barrier VDC copolymers with high (85 weight % and up) vinylidene chloride content. They would not be expected to be capable of shrinking to such extents without cracking, chipping, flaking and whitening and thus becoming nonfunctional. It is believed that this, along with the tendency of many two-layered films to curl, is why in all prior art applications the VDC copolymer layer was placed between other polymeric layers for support.

This film can be used as a shrink overwrap for products that need oxygen, aroma, or moisture protection. Examples are refrigerated entrees, cookies, cereals, baked goods, shelf-stable soups, flavored drinks, cheeses, and soaps. The barrier properties can extend product shelf-life, secure product flavor-aroma, and prevent undesirable odor from getting into the package. The shrinkable feature of this film adds other benefits such as tamper evidence, adaptability to various shapes, and bundling ability.

DESCRIPTION OF THE DRAWINGS

FIG. 1 is a graph comparing the shrinkage properties of films of this invention with a control (uncoated polyolefin) shrink film.

FIG. 2 is a graph illustrating the optical properties of a film of this invention at different degrees of shrinkage.

DETAILED DESCRIPTION OF THE INVENTION

The heat-shrinkable polyolefin films used as the base film in preparing the barrier shrink film of this invention are known in the art. Suitable films include films of polyethylene (high, medium or linear low density), polypropylene and propylene/ethylene copolymers and ethylene vinyl acetate copolymers and blends of any of the above with each other. Preferred are propylene-/ethylene copolymers containing 1 to 4% ethylene.

The ability of polyolefin films to shrink upon exposure to some level of heat arises from the orientation of the films during manufacture. The films are usually heated to their orientation temperature range which varies with the different polymers but is usually above room temperature and below the polymer's melting temperature. The film is then stretched in the cross or transverse direction and in the longitudinal or machine direction to orient it. Generally, the films of this invention are stretched to about 2 to 7 times their original dimensions in either the transverse direction (TD) or the machine direction (MD), or in both directions. The preferred propylene/ethylene films of this invention are generally stretched to about 5×3.5 (TD×MD) their original dimensions. After being stretched, the film is rapidly cooled to quench it, thus freezing the molecules of the film in their oriented state. Upon heating, the orientation stresses are relaxed and the film will begin to shrink back to its original, unoriented dimension.

Since polyolefin films are substantially nonpolar, the direct application of the VDC copolymer coating to the films is not possible. It has been found that the best adhesion of the VDC copolymer coating to the polyolefin film can be attained by treating the surface of the polyolefin film so that it has a minimum surface energy of about 40 dynes/cm, although acceptable results can be achieved at levels down to 35 dynes/cm. Preferably, the energy level of the film will be about 45° to 55 dynes/cm. Surface treatment is achieved by methods known in the art such as corona discharge treatment, electro contact treatment, or flame treatment.

The VDC copolymers coated onto the polyolefin base film are described previously. Preferably, high barrier VDC copolymers, i.e. those with 85% to 96%, and more preferably 90% to 96%, polyvinylidene chloride content are used. The most preferred vinylidene chloride range is 88 to 92%. The VDC copolymers are applied to a coating weight of from about 1 to 10 grams/meter$^2$, preferably from 2.5 to 5 grams/meter$^2$.

The VDC copolymers are applied to the polyolefin film from a dispersion generally consisting of about 35 to 45% by weight VDC copolymer solids in water. Surfactants such as sodium lauryl sulfate and slip agents such as silica may be added to the dispersion to improve wettability and slip. The VDC copolymer dispersion is applied to the surface-treated, oriented polyolefin film in the desired amount and is then subjected to radiant heat for a period of about 10 to 20 seconds in, for example, a conventional dispersion coating tower, to aid drying. The average film temperatures during the drying process can reach temperatures of from 50° to 100° C. and substantially all (preferably 99.9%) of the water is removed from the film. Surprisingly, tests indicate that the film shrinks less than 5% in either direction during this high-temperature heating process.

The heat-shrinkable barrier film of this invention can be used to package items such as perishable food items by enclosing the item in the film and exposing the wrapped item to a temperature above the orientation temperature of the film (generally in the range of 100° to 130° C. for films of this invention) for a period of time sufficient to biaxially shrink the film. The films of this invention are capable of shrinking in excess of 10%, preferably in excess of 15%, in either the machine or transverse directions, or both. Tests indicate that even upon shrinkage to as great an extent as 35%, the optical properties of the film remain acceptable. The % shrinkage reported in FIG. 1, as well as that reported in Table 2 and FIG. 2, is the average of the % shrinkage in the machine and transverse directions.

The invention disclosed herein is further illustrated in the following examples.

EXAMPLE 1

A two-ply barrier shrink film was prepared by coating one side of an oriented polyolefin shrink film with a saran dispersion. The base film was a 75-gauge biaxially oriented film of propylene/ethylene copolymer containing 3-4% ethylene. which had been corona-treated to have a surface energy level of about 36 dynes/cm. The dispersion was a mixture of vinylidene chloride/-methyl methacrylate/itaconic acid terpolymer in the weight proportions of 90.5/8.5/1, plus surfactants and soft water. The dispersion bath had about 40 to 44% of solids and a film-forming temperature of less than 50° C. A conventional dispersion coating tower was used. The tower speed was 568 ft/min. The film temperature in the middle of the drying section of the tower was 60° C. A hot roll at the exit of the tower was set at 82° C. to ensure good adhesion.

After drying, the film was found to have shrunk only 3% in the transverse direction and it had no curl. However, the "wettability" of the saran at this surface energy level was not totally satisfactory. Other properties of the film are shown in Table 1. The crystallinity index (minimum standard is 1.15) and cold peel strength indicate that the coating had good coalescence and adhesion.

Generally, the base film of propylene/ethylene copolymer has an oxygen transmission rate (OTR) of about 3800 to 4600 cm$^3$/m$^2$/day. With the coating, the OTR was greatly reduced. The same thing was true for carbon dioxide and water vapor transmission rates.

The shrinkage property of this film is shown in FIG. 1. To determine percent shrinkage, one compares the dimensions of the coated, dried film with the dimensions of the same film after it is exposed to a temperature of at least 100° C. for a period of at least ten seconds. One convenient method for achieving such high temperature exposure for the purpose of experimentally measuring percent shrinkage, and the method used in the examples, is by immersing a 1" by 5" film sample in silicon oil maintained at the high temperature. The high percentage shrink without greatly affecting the optical properties makes this film an attractive barrier shrink wrap material.

EXAMPLE 2

The same raw materials and general method used in Example 1 were used to prepare a barrier shrink film except that the base film was corona-treated to have a surface energy level of 54 dynes/cm. Tower speed was 628 ft/min. The average film temperature in the drying tower was 57° C. The hot roll temperature was 80° C.

"Wettability" in this case was excellent, and after drying the film was found to have shrunk only 3.5% in the transverse direction without curls. Optical properties were very good (see Table 1). The shrinkage property is illustrated in FIG. 1.

EXAMPLE 3

The same raw materials and general methods as in Examples 1 and 2 were used to prepare a barrier shrink film except that the base film was 100 gauge thick and was corona-treated to have a surface energy level of 51 dynes/cm. Tower speed was 592 ft/min. The average film temperature in the drying tower was 54° C. and the hot roll temperature was 79° C.

The film shrunk only 1% during drying and had the same shrinkage property as the film in Example 2, as seen in FIG. 1. There was no problem in "wettability". Other properties are shown in Table 1.

Samples of this film were heat-shrunk to varying degrees after which optical properties were measured. These results, presented in Table 2 and FIG. 2, indicate that excellent optical properties are retained up to at least 30% shrinkage and that acceptable properties are retained up to at least 35% shrinkage. "Acceptability" varies, of course, depending on end use.

EXAMPLE 4

A barrier shrink film was made by the general methods of Examples 1–3 by coating a dispersion of Daran 8700 (product of W. R. Grace and Company, a copolymer of vinylidene chloride/methylmethacrylate/itaconic acid in weight proportions of 90.5/8.5/1) to a coating weight of 3.5 g/m² onto the base film used in Example 2. Coating tower conditions were the same as those for Example 2. The OTR of the barrier film was found to be 25.3 cm³/m²/day.

TABLE 2

Optical Properties of Film of Example 3

| % Shrinkage | Clarity % | Surface Gloss (photo cell) | Haze % |
|---|---|---|---|
| 0 | 72 | 146 | 2.3 |
| 25 | 63 | 114 | 3.7 |
| 30 | 51 | 93 | 7.1 |
| 35 | 19 | 26 | 18.9 |

TABLE 2-continued

Optical Properties of Film of Example 3

| % Shrinkage | Clarity % | Surface Gloss (photo cell) | Haze % |
|---|---|---|---|
| 40 | 4 | 5 | 52.3 |

What is claimed is:

1. A process for making a heat-shrinkable barrier film comprising coating an oriented polyolefin film having a surface energy of at least 35 dynes/cm on at least one side with an aqueous dispersion of vinylidene chloride copolymer, exposing the coated film to heat at a temperature and for a period of time sufficient to raise the temperature of the film to about 50° C. to about 100° C. and sufficient to remove substantially all of the water, whereby a film is produced capable of shrinking at least about 10 percent upon heating to about 100° to 120° C.

2. A process of claim 1 where the vinylidene chloride copolymer contains about 85 to 96% by weight vinylidene chloride.

3. A process of claim 2 where the vinylidene chloride copolymer contains about 88 to 92% by weight vinylidene chloride.

4. A process of claim 1 where the polyolefin film is a film of propylene/ethylene copolymer containing 1 to 4% ethylene.

5. A process of claim 1 where the polyolefin film is treated prior to coating to have a surface energy of about 40 to 55 dynes/cm.

6. A process of claim 1 where the aqueous dispersion of vinylidene chloride copolymer contains about 35 to 45% by weight solids.

7. A process of claim 1 where the vinylidene chloride copolymer is applied to a dry coating weight of about 2.5 to 50 g/m².

TABLE 1

| | Unit | Test Method | Example 1 | Example 2 | Example 3 | Control* |
|---|---|---|---|---|---|---|
| Base film thickness | gauge | ASTM D374 | 75 | 75 | 100 | 100 |
| Final film thickness | gauge | ASTM D374 | 85 | 83 | 110 | 100 |
| Coating weight | gm/m² | — | 4.7 | 3.2 | 2.7 | 0 |
| Cold peel strength | gm/in | ASTM D903 | 265 | 183 | 161 | — |
| Crystallinity index | — | — | 1.24 | 1.25 | 1.33 | — |
| OTR | cm³/m²/day | ASTM D1434 | 25.6 | 25.5*** | 15.5*** | 4030 |
| CO₂TR | cm³/m²/day | ASTM D1434 | 21.7 | — | — | 7828 |
| WVTR | gm/m²/day | ASTM E96-E | — | 3.7 | 3.3 | 7.8 |
| Clarity** | % | ASTM D1746 | 73.5 | 74.0 | 72.2 | 79.0 |
| Surface gloss (20°)** | photocell | ASTM D2457 | 132 | 153 | 146 | 114 |
| Haze** | % | ASTM D1003 | 2.7 | 2.2 | 2.3 | 1.0 |
| Coefficient of friction | coating to coating | ASTM D1894 | 0.3 | 0.3 | 0.3 | 0.3 |
| Tensile Strength | KPSI | ASTM D882 | — | 13 | 16 | 15 |
| Stiffness modulus | KPSI | ASTM D882 | — | 177 | 186 | 152 |
| Elongation at break | % | ASTM D882 | — | 135 | 145 | 130 |

OTR - Oxygen transmission rate on shrunk samples in cm³/m²/day at 30° C. and 80% relative humidity.
CO₂TR - Carbon dioxide transmission rate on shrunk samples in cm³/m²/day at 24° C. and 0% relative humidity.
WVTR - Water vapor transmission rate in gm/m²/day at 38° C. and 90% relative humidity.
*Control film is an uncoated, oriented film of propylene/ethylene copolymer containing 3–4% ethylene
**Before shrinking
***Minimum values observed.

8. A process of claim 1 where the polyolefin film is a film of propylene/ethylene copolymer containing 1 to 4% ethylene and has a surface energy of about 40 to 55 dynes/cm., and the vinylidene chloride copolymer contains about 88 to 92% by weight vinylidene chloride.

9. A film made by the process of claim 1.

10. A film made by the process of claim 8.

11. A method of packaging an article comprising enclosing the article in a film of claim 9 and exposing the wrapped item to a temperature of about 100° to about 130° C. for a period of time sufficient to shrink the film up to an amount of about 10–35%.

* * * * *